(12) United States Patent
Mullins et al.

(10) Patent No.: US 6,627,711 B2
(45) Date of Patent: Sep. 30, 2003

(54) TRANSITION METAL DONOR COMPLEXES AND OLEFIN POLYMERIZATION PROCESS

(75) Inventors: Michael J. Mullins, Lake Jackson, TX (US); Phillip S. Athey, Lake Jackson, TX (US); Peter N. Nickias, Midland, MI (US); Jorge Soto, Midland, MI (US); Harold W. Boone, Sugar Land, TX (US); R. Vernon Snelgrove, Damon, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/104,807

(22) Filed: Mar. 22, 2002

(65) Prior Publication Data

US 2002/0147287 A1 Oct. 10, 2002

Related U.S. Application Data

(60) Provisional application No. 60/281,349, filed on Apr. 4, 2001.

(51) Int. Cl.$^7$ .............. C08F 4/64; C08F 4/642
(52) U.S. Cl. .......... 526/127; 526/126; 526/161; 526/172; 502/155; 502/117; 502/167; 502/168
(58) Field of Search ............... 526/126, 127, 526/161, 172

(56) References Cited

U.S. PATENT DOCUMENTS 5,502,128 A  3/1996 Flores et al.

FOREIGN PATENT DOCUMENTS

WO  WO 98/030612  7/1998
WO  WO 99/57159  * 11/1999

OTHER PUBLICATIONS

Fryzuk et al., Organometallics 11 (1992) 469–472.*
Chem. Commun., "Novel olefin polymerization catalysts based on iron and cobalt", 1998, 849–850, Britovsek et al.
Fryzuk M. D., Can. J. Chem., "The 1992 Alcan Aware Lecture; Excursions around the periodic table: ligand design in inorganic chemistry", 1992, vol. 70, 2839–2845.
Fryzuk, Michael D., et al, Organometallics, Synthesis and Characteriation of the Five–Coordinate Scandium Dialkyl Complexes Scr2[N(SiMe2CH2Ppri2)2] (R=Me, Et, Ch2SiMe3) 1996, No. 15, 3329–3336.
JACS, "Highly active iron and cobalt catalysts for the polymerization of ethylene", 1998, 120, 4049–4050.
J. Schellengerg, USSN 60/326,498, filed Oct. 1, 2001, "Bulky Amido Group Substituted Group 4 Metal Compounds and Polymerization Process".

* cited by examiner

Primary Examiner—David W. Wu
Assistant Examiner—R. Rabago

(57) ABSTRACT

A process for polymerization of addition polymerizable monomers with a catalyst composition comprising a Group 4 or 5 metal bis(silane)amido complex corresponding to the formula:

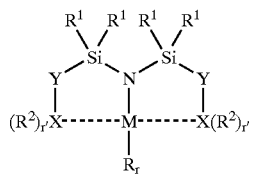

where the various substituents are as defined in claim 1.

6 Claims, 1 Drawing Sheet

TRANSITION METAL DONOR COMPLEXES AND OLEFIN POLYMERIZATION PROCESS

CROSS REFERENCE STATEMENT

This application claims the benefit of U.S. Provisional Application No. 60/281,349, filed Apr. 4, 2001.

FIELD OF THE INVENTION

This invention relates to a class of metal complexes, the ligands used to prepare these metal complexes and to olefin polymerization catalysts derived therefrom that are particularly suitable for use in a polymerization process for preparing polymers by polymerization of olefins and mixtures of olefins. Surprisingly, the resulting polymers have been found to possess novel rheological properties indicative of the presence of cross-linking therein. Blends of the resulting polymers with conventional olefin polymers are highly useful in the formation of films for packaging and storage applications and in the preparation of fibers.

BACKGROUND

Metal complexes containing polydentate chelating ligands are well known in the art. Examples include complexes based on acetylacetonate (AcAc), tetramethylethylenediamine, and other polydentate chelating ligands disclosed in WO 98/030612, Chem. Commun., 1998, 849, JACS, 1998, 120, 4049, and elsewhere. Transition metal complexes based on polydentate derivatives of pyridine are disclosed in WO 98/30612. Examples of multidentate, silane containing complexes include, Fryzuk M. D., Can. J. Chem., 1992, vol 70, 2839–2845, Fryzuk, Michael D., et al, Organometallics 1996, No 15, 3329–3336, and WO 99/57159.

Despite advances in the present art, there remains a need for metal complexes having improved catalytic properties. It would be advantageous to be able to produce polyolefins with improved physical properties. It would be especially advantageous to be able to produce polyolefins, particularly homopolymers and copolymers of ethylene having improved melt strength.

SUMMARY OF THE INVENTION

According to the present invention there is provided a process for polymerization of addition polymerizable monomers comprising contacting said monomer under addition polymerization condition with a catalyst composition comprising the reaction product or admixture of:

(A) a metal complex corresponding to the formula:

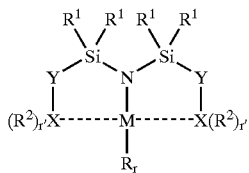

where,
Y is a divalent bridging group, preferably, —$(CH_2)_{n'}$— where n' is an integer from 1 to 6, —O—, —S—, or =$NR^1$;

$R^1$ and $R^2$ are each occurrence independently selected from alkyl, aryl, hydrogen, aryloxy, arylthio, alkyloxy, or alkylthio, having up to 10 atoms not counting hydrogen;

X is phosphorus, sulfur, nitrogen, or oxygen;

r' is 1 or 2 to satisfy the valence of X, and when r' is 2, the group $(R^2)r'$ can optionally be a divalent group that together with X forms a ring, preferably —$(CH_2)_{n'}$—, where n' is an integer from 1 to 6;

M is a group 4 metal in the +4 oxidation state, or a group 5 metal in the +5 oxidation state;

R is a monovalent ligand group or 2 R groups together are a divalent ligand group; and r is 3 or 4 depending on the valence of M; and (B) an activating cocatalyst, wherein the molar ratio of (A) to (B) is from 1:10,000 to 100:1, and recovering the resulting polymeric product.

Within the scope of this invention are the polyolefin products produced by the aforementioned process, or mixtures thereof with additional polymers, especially additional polyolefin polymers. Preferred products are polyolefins having improved melt rheology properties. It is believed such properties are due to the presence of minor quantities of cross-linkages to other polymer molecules. Such cross-linkages are produced in the polymerization process and not attributable to a crosslink generating comonomer, although such comonomer may additionally be present in the reaction if desired. Desirably, the quantity of such cross-linked polymers is on the order of 0.01 to 10 percent, more preferably 0.01 to 1 percent of the polymer molecules. The presence of such cross-linked functionality is evidenced by $^{13}C$ NMR spectroscopy, by the presence of a peak at approximately 39.5 ppm measured in $C6D_6$ and the substantial absence of ethyl branches.

DETAILED DESCRIPTION

Figure 1:
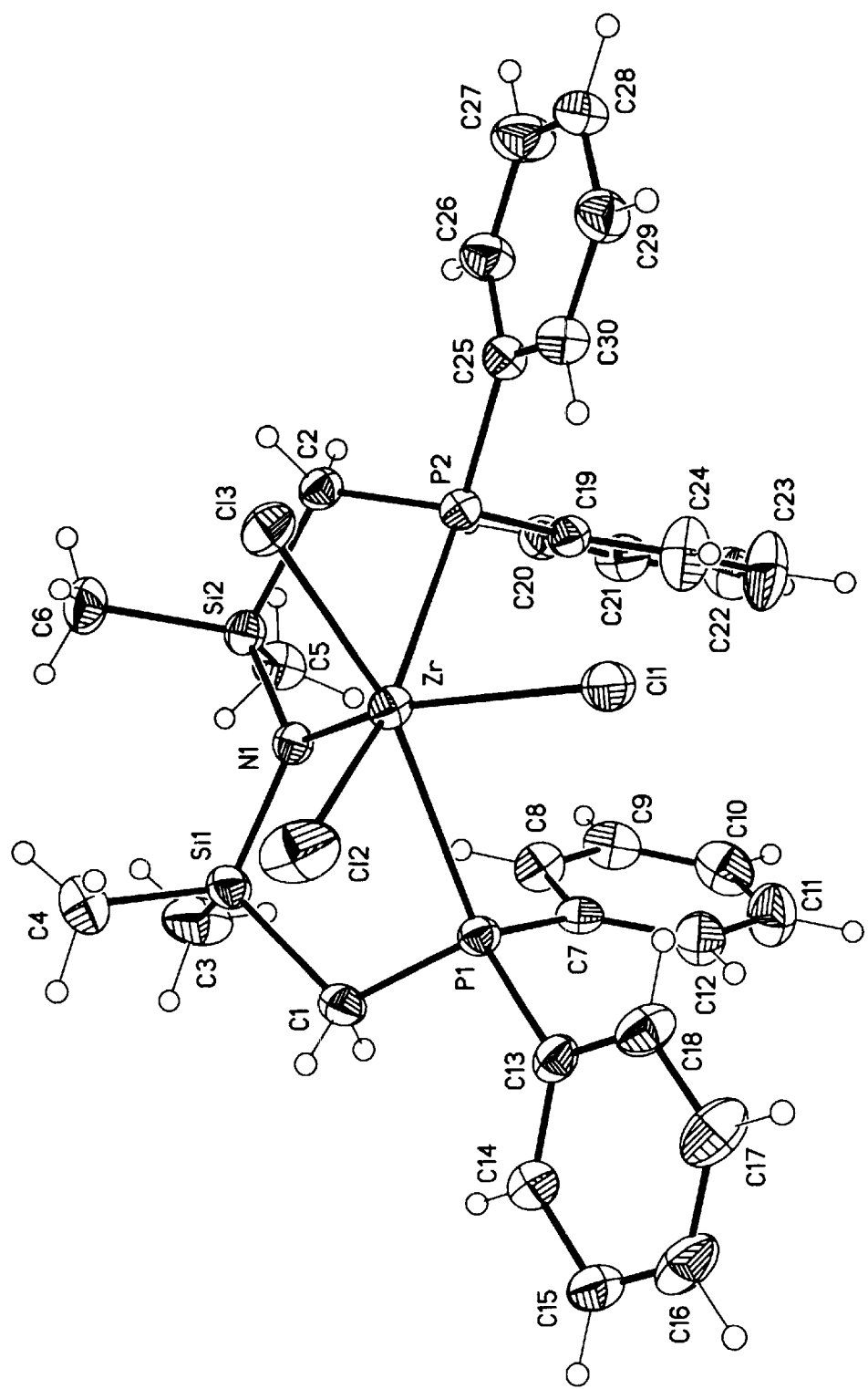
FIG. 1 is the crystal structure (ORTEP) derived from single crystal X-ray analysis of bis((diphenylphosphinomethyl)dimethylsilyl)amido)zirconium trichloride prepared in Preparation 4.

All reference to the Periodic Table of the Elements herein shall refer to the Periodic Table of the Elements, published and copyrighted by CRC Press, Inc., 1989. Also, any reference to a Group or Groups shall be to the Group or Groups as reflected in this Periodic Table of the Elements using the IUPAC system for numbering groups. For purposed of United States patent practice, the full teachings of any patent, patent application, provisional application, or publication referred to herein are hereby incorporated by reference. The term "comprising" when used herein with respect to a composition or mixture is not intended to exclude the additional presence of any other compound or component.

Olefins as used herein are $C_{2-20}$ aliphatic or aromatic compounds containing vinylic unsaturation, as well as cyclic compounds such as cyclobutene, cyclopentene, and norbornene, including norbornene substituted in the 5- and 6-positions with $C_{1-20}$ hydrocarbyl groups. Also included are mixtures of such olefins as well as mixtures of such olefins with $C_{4-20}$ diolefin compounds. Examples of the latter compounds include ethylidene norbornene, 1,4-hexadiene, and norbornadiene. The catalysts and processes herein are especially suited for use in preparation of ethylene/1-butene, ethylene/1-hexene, ethylene/styrene, ethylene/propylene, ethylene/1-pentene, ethylene/4-methyl-1-pentene and ethylene/1-octene copolymers as well as terpolymers of ethylene, propylene and a nonconjugated diene, such as, for example, EPDM terpolymers.

The present catalysts and processes may be used in a solution or bulk polymerization, a slurry polymerization or a gas phase polymerization process. The catalysts of this invention may also be supported on a support material and used in any of the foregoing olefin polymerization processes. The catalyst may also be prepolymerized with one or more olefin monomers in situ in a polymerization reactor or in a separate process with intermediate recovery of the prepolymerized catalyst prior to the primary polymerization process.

A preferred polymerization process is a high temperature solution polymerization process for the polymerization of ethylene, or a mixture of ethylene with one or more $C_{3-20}$ a-olefins at a temperature from 70 to 250° C., more preferably from 80 to 220° C., most preferably from 90 to 200° C.

Preferably, the metal, M, is a metal of Group 4 of the Periodic Table of the Elements, especially Zr.

Preferred R groups are halide, hydrocarbyl (including alkyl, alkenyl, aryl, alkaryl, aralkyl cycloalkyl and cycloalkenyl) hydrocarbyloxide, hydrocarbylsulfide, N,N-dihydrocarbylamide, hydrocarbyleneamide, and N-hydrocarbylimide, groups, said R having from 1 to 20 atoms not counting hydrogen.

Preferred coordination complexes according to the present invention are complexes corresponding to the formula I:

where M is zirconium;

X is nitrogen or phosphorus;

Y is $(CH_2)_{n'}$ wherein n' is 1–4, most preferably 1 or 2;

$R^1$ is chloride, N,N-dimethylamino or $C_{1-10}$ hydrocarbyl;

$R^1$ is $C_{1-6}$ hydrocarbyl, most preferably methyl; and $R^2$ is $C_{1-6}$ hydrocarbyl, most preferably isopropyl or phenyl.

Most preferred metal complexes for use in the present invented process are N,N-bis((diphenylphosphinomethyl) dimethylsilyl)amido)zirconium trichloride; bis ((diphenylphosphinomethyl)dimethylsilyl)amido)zirconium tris(N,N-dimethylamide); bis((diphenylphosphinomethyl) dimethylsilyl)amido)zirconium bis(N,N-dimethylamide) chloride; and bis((diphenylphosphinomethyl)dimethylsilyl) amido)zirconium (N,N-dimethylamide)dichloride. The foregoing metal complexes have the formula:

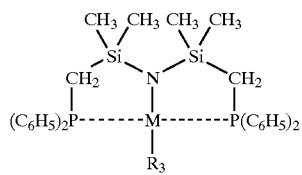

wherein R is chloride, N,N-dimethylamido or a mixture thereof.

Formation of the metal complexes uses conventional organic- and organometallic-synthetic procedures. The reactions are conducted in a suitable noninterfering solvent at a temperature from −100 to 300° C., preferably from −78 to 100° C., most preferably from 0 to 50° C.

Suitable reaction media for the formation of the complexes include aliphatic and aromatic hydrocarbons, ethers, and cyclic ethers, particularly branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; aromatic and hydrocarbyl-substituted aromatic compounds such as benzene, toluene, and xylene, $C_{1-4}$ dialkyl ethers, $C_{1-4}$ dialkyl ether derivatives of (poly)alkylene glycols, and tetrahydrofuran. Mixtures of the foregoing solvents or diluents are also suitable.

The complexes are rendered catalytically active by combination with an activating cocatalyst. Suitable activating cocatalysts for use herein include polymeric or oligomeric alumoxanes; $C_{1-20}$ hydrocarbyl substituted Group 13 element containing, Lewis acid compounds; Bronsted acids containing an inert, non-coordinating anion containing a $C_{1-20}$ hydrocarbyl substituted Group 13 element; mixtures of the foregoing alumoxanes or alumoxane/Lewis acid mixtures with one or more aliphatic or aromatic ethers; and mixtures of the foregoing. Examples of suitable activating cocatalysts include: trispentafluorophenylborane, methyldi ($C_{14-18}$alkyl)-ammonium tetrakis(pentafluorophenyl)borate, (pentafluorophenyl)di($C_{14-18}$alkyl)ammonium tetrakis-(pentafluorophenyl)borate, dimethyl($C_{14-18}$alkyl) ammonium tetrakis(pentafluorophenyl)-borate, methylalumoxane, triisobutylaluminum modified methylalumoxane, or a mixture thereof.

Preferred Lewis acids especially include tri(hydrocarbyl) aluminum- or tri(hydrocarbyl)boron-compounds and halogenated (including perhalogenated) derivatives thereof, having from 1 to 15 carbons in each hydrocarbyl or halogenated hydrocarbyl group, more especially perfluorinated tri(aryl) boron compounds, and most especially tris(o-nonafluorobiphenyl)borane, tris(pentafluorophenyl)borane; tris(o-nonafluorobiphenyl)-aluminum; tris (pentafluorophenyl)-aluminum, and mixtures thereof. Preferred ethers include diethyl ether and diisopropyl ether. Most preferred cocatalysts are the alumoxanes, especially methylalumoxane, triisobutylaluminum modified methylalumoxane, or a mixture thereof.

Suitable polymerizable monomers include ethylenically unsaturated monomers, acetylenic compounds, conjugated or non-conjugated dienes, and polyenes. Preferred monomers include olefins, for examples alpha-olefins having from 2 to 20,000, preferably from 2 to 20, more preferably from 2 to 8 carbon atoms and combinations of two or more of such olefins. Particularly suitable olefins include, for example, ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{10-30}$ α-olefins specifically added to the reaction mixture in order to produce relatively long chain branches in the resulting polymers. Preferably, the alpha-olefins are ethylene, propene, 1-butene, 4-methyl-pentene -1,1-hexene, 1-octene, and combinations of ethylene and/or propene with one or more of such other alpha-olefins. Other preferred monomers include styrene, halo- or alkyl substituted styrenes, tetrafluoroethylene, vinylchloride, vinylcyclobutene, 1,4-hexadiene, dicyclopentadiene, ethylidene norbornene, and 1,7-octadiene. Mixtures of the above-mentioned monomers may also be employed.

In general, the polymerization may be accomplished at conditions well known in the prior art for solution phase, slurry, gas phase and high pressure Ziegler-Natta or Kaminsky-Sinn type polymerization reactions. Examples of such well known polymerization processes are depicted in U.S. Pat. No. 5,084,534, U.S. Pat. No. 5,405,922, U.S. Pat. No. 4,588,790, U.S. Pat. No. 5,032,652, U.S. Pat. No. 4,543,399, U.S. Pat. No. 4,564,647, U.S. Pat. No. 4,522,987, and elsewhere. Preferred polymerization pressures are from atmospheric to 3000 atmospheres. Molecular weight control agents can be used in combination with the present cocatalysts. Examples of such molecular weight control agents include hydrogen, silanes or other known chain transfer agents. The catalyst composition may be used by itself (homogeneously) or supported on a support material. Suitable support materials include metal halides, metal oxides, metal nitrides, metalloid oxides, metalloid carbides, clays and polymeric hydrocarbons. Preferred supports include silica, alumina, aluminosilicates, clays, borosilicates, boron nitrides, boron carbides, mixed oxides of magnesium and aluminum and/or silicon, including expanded clay materials, and the foregoing materials having residual hydroxyl groups thereof reacted with trialkyl aluminum compounds.

The catalyst composition (whether based on a catalyst complex or catalyst compound) may further comprise an electron donor compound which may interact with either the metal complex or metal compound, the support, or the combination of the metal complex and support or metal compound and support to give improved (greater quantity) of isospecific polymer formation. Suitable electron donors include both internal donor and external donors. Specific examples include alkyl esters- or alkyl diesters- of aromatic acids, especially $C_{1-4}$ alkylbenzoates, most especially ethylbenzoate, or $C_{1-4}$ dialkylphthalates, most especially dibutyl phthalate; and alkylsiloxanes, especially phenyl triethyloxysilane. Electron donors are previously known in the art for improved isoselective polymer formation, and have been discussed in K. Soga, et al., *Prog. Polym. Sci.* 22, 1503–1546, (1997), and elsewhere.

The skilled artisan will appreciate that the invention disclosed herein may be practiced in the absence of any component which has not been specifically disclosed. The following examples are provided as further illustration of the invention and are not to be construed as limiting. Unless stated to the contrary all parts and percentages are expressed on a weight basis. Where stated, the term "room temperature" refers to a temperature from 20 to 25° C., the term "overnight" refers to a time from 12 to 18 hours, and the term "mixed alkanes" refers to a mixture of propylene oligomers sold by Exxon Chemicals Inc. under the trade designation Isopar™ E.

EXAMPLES $^1$H (300 MHz) and $^{13}$C NMR (75 MHz) spectra were recorded on a Varian XL-300 spectrometer or a Bruker Avance 250 MHz instrument. $^1$H and $^{13}$C NMR spectra are referenced to the residual solvent peaks and are reported in ppm relative to tetramethylsilane. $^{31}$P NMR spectra were referenced to external phosphoric acid (0.0 ppm). All Jvalues are given in Hz. Tetrahydrofuran (THF), diethylether, toluene, and hexane were used following passage through double columns charged with activated alumina and catalyst (Q-5®, available from Englehardt Chemicals Inc.). All reagents were purchased or prepared according to published techniques. All syntheses were performed under dry nitrogen or argon atmospheres using a combination of glove box and high vacuum techniques at room temperature unless indicated otherwise.

Preparation 1 Bis((diphenylphosphinoethyl)dimethylsilyl) amido)zirconium trichloride
A. $Ph_2PCH_2CH_2SiClMe_2$ A 25 mL roundbottomed 3-necked flask equipped with magnetic stirring, a septum, a Vigreux topped with a nitrogen inlet, and a small mercury lamp was charged with diphenylphosphine (5.0 mL, FW 186.2, 1.070 g/mL, 28.7 mmole), chlorodimethylvinylsilane (FW 120.66, 0.874 g/mL, 28.7 mmol, 4.00 mL) under a nitrogen atmosphere. The lamp was turned on and the contents were periodically analyzed by gas chromatography. After leaving the lamp on overnight, benzene (~8 mL) was added, along with 13 mg azoisobutyronitrile (AIBN). The reaction was heated to reflux for a total of 16 h. During this time, additional AIBN was added after 2 h (21 mg), 5 h (18 mg), 8 h (10 mg). Additional chlorodimethylvinylsilane (FW 120.66, 0.874 g/mL, 14.4 mmol, 2.00 mL) and AIBN (10 mg) was added after 10 h. The benzene was distilled off, and the viscous product was distilled at 0.2 torr (30 Pa) vacuum. A fraction (3.41 g) distilling between 120–200° C. was kept. This fraction partially crystallized on standing.

(B) $(Ph_2PCH_2CH_2SiMe_2)_2NH$

A 3-necked, 100 mL roundbottomed flask equipped with a dry-ice condenser with a nitrogen bubbler, a septum, a gas inlet attached to an ammonia lecture bottle, and magnetic stirring was charged with ~5 mL liquid NH3 while the flask was cooled with dry-ice/acetone. Petroleum ether (20 mL) was added slowly, followed by $Ph_2PCH_2CH_2SiCl(Me_2)$ (FW 306.8, 4.44 g, 14.5 mmol). No visible reaction occurred. The dry-ice bath was removed, and it appeared that the condensation started as the ammonia started to reflux. A white suspension formed. The excess ammonia was allowed to boil off, and the flask warmed to room temperature. The solid was filtered and the filtrate was evaporated. The viscous liquid was passed through a silica gel plug using 10 mL 50/50 (v/v) hexane/toluene. All of the eluent was evaporated to give an extremely viscous, hazy liquid (3.5 g).

$^1$H NMR (CDCl$_3$) 67 : 7.3–7.5 (m), 1.9–2.0 (m), 04–0.6 (m), -0.05 (s): 31p NMR in CDCl$_3$, δ: -9 ppm with a small impurity at −40 ppm (C) $(Ph_2PCH_2CH_2SiMe_2)_2N$-$ZrCl_3$ In a dry-box, a 25 mL vial was charged with $(Ph_2PCH_2CH_2SiMe_2)_2NH$ (FW 557.8, 0.208 g, 0.374 mmol), $Zr(NMe_2)_4$ (FW 267.5, 0.100 g, 0.374 mmol), and 2 mL toluene. After stirring for 1 h, the toluene was evaporated under vacuum to give a yellow-green viscous liquid which was analyzed by $^1$H NMR in C6D$_6$, δ: 7.4–7.6 (m, 8H), 7.0–7.2 (m, 12H), 3.0 (s, 6H), 2.75 (s, 12H), 2.0–2.2 (m, 4H), 0.75–0.9 (m, 2H), 0.6–0.75 (m, 2H), 0.2 (s, 12H), which is consistent with the desired intermediate $(Ph_2PCH_2CH_2SiMe_2)_2NZr(NMe_2)_3$. This liquid was redissolved in toluene, and treated with Me$_3$SiCl (FW 108.64, density 0.856 g/mL, 0.15 mL, 1.18 mmol). After 1 hour, solvent was removed under vacuum. Hexane was added to the sticky solid, giving a creamy-white solid which was filtered and washed with additional hexane to give 173 mg of product.

$^1$H NMR in C$_6$D$_6$, 6: 7.6–7.9 (m, 8H), 6.9–7.1 (m, 12H), 2.2–2.4 (m, 4H), 0.8–1.0 (m, 4H), 0.4 (s, 12H).

Preparation 2 Bis((phenylthiomethyl)dimethylsilyl)amido) zirconium trichloride
(A) $(PhSCH_2SiMe_2)_2NLi$ Thiophenol (0.75 g, 6.8 mmol) and 25 mL of dry THF were added to a 50 mL roundbottomed flask. The solution was cooled to −40° C. To the cold, stirring, THF solution, n-BuLi (4.25 mL of 1.6 M, 6.8 mmol) was added dropwise. The solution was allowed to warm and was stirred 30 min at ambient temperature. The disilazane (ClCH$_2$SiMe$_2$)$_2$NH (0.78 g, 3.4 mmol) was then added dropwise, and the reaction solution was heated to 65° C. for 2 h. The THF was stripped off from the cooled solution. The remaining solids were washed extensively with hexane. The hexane filtrate was stripped to dryness, then taken back up in 15 mL of hexane. The solution was cooled to −40° C. followed by the addition of n-BuLi (2.1 mL, 1.6 M). The mixture was stirred for 2 h at ambient temperature, and then was kept at −30° C.

overnight. The following morning, the product was filtered off and rinsed with —30° C. hexane. The solids were dried under vacuum. The amount of product isolated was 0.88 g (48 percent).

$^1$H NMR (C6D$_6$) δ 0.3 (12H, s), 2.5 (4H, s), 6.9–7.6 (m, 10H) ppm; $^{13}$C NMR (C$_6$D$_6$) δ 5.0, 32.3, 126.2, 127.2, 129.5, 138.5 ppm.

(B) (PhSCH$_2$SiMe$_2$)$_2$N-ZrCl$_3$

In the dry box, a 25 mL vial was charged with 256 mg of the lithium salt of the ligand (PhSCH$_2$SiMe$_2$)$_2$NLi (FW 383.6, 0.667 mmol) and THF (7 mL). A separate solution of anhydrous ZrCl$_4$ (Strem, 157 mg, FW 233.0, 0.674 mmol) was also prepare. Both solutions were cooled to −30 C and then they were mixed with magnetic stirring. The resulting suspension was allowed to warm to ambient temperature, and then stirred overnight. The solution was filtered, evaporated, and then extracted with toluene. The solvent was removed, leaving an oily residue. No further purification was performed.

$^1$H NMR (C6D$_6$) δ 0.18 (s, 12H), 2.03 (s, 4H), 6.85–7.0 (m, 2H), 7.05 (t, 4H, J=7 Hz), 7.25 (d, 4H, J=7 Hz) ppm: $^{13}$C NMR (CrD$_6$) 0.8,20.3, 124.9, 126.6, 129.0, 140.8 ppm.

Preparation 3 Bis((diphenylphosphinomethyl)dimethylsilyl)amido)zirconium (N,N-dimethylamido)dichloride In the dry box, a 25 mL vial equipped with a magnetic stirrer was charged with Zr(NMe$_2$)$_4$ (available from Strem, Inc., 100 mg, FW 267.5, 0.374 mmole), (Ph$_2$PCH$_2$SiMe$_2$)$_2$NH (prepared substantially according to the procedure of Organometallics 1982, 1, (918–930)) (200 mg, FW 529.7, 0.378 mmole), and 3 mL toluene. The yellow solution was stirred for about an hour, and then treated with chlorotrimethyl silane (100 μL, density 0.856 g/mL, FW 108.64, 0.788 mmol). The solvent was evaporated, and the viscous yellow liquid was washed with pentane to remove a small amount of unreacted amine ligand.

1H in CrD$_6$: 0.2 (br s, 12H, SiMe$_2$); 1.6 (br s, 4H, PCH$_2$Si); 2.95 (s, 6H, NMe$_2$); 6.9 (br s, 8H, Ar-H), 7.7 (br s, 12H, Ar-H): $^{31}$P in C6D$_6$: -13.1 ppm. Light yellow microcrystals (32 mg) were obtained by cooling a toluene solution to −30° C.

Preparation 4 Bis((diphenylphosphinomethyl)dimethylsilyl)amido)zirconium trichloride An NMR tube was charged with Zr(NMe$_2$)$_4$ (FW 267.5, 12 mg, 0.45 mmol), (Ph$_2$PCH$_2$SiMe$_2$)$_2$NH (FW 529.7, 15 mg, 0.028 mmol), and 0.5 mL C6D$_6$. After heating the red solution briefly to reflux, Me$_3$SiCl (FW 108.64, density 0.856 g/mL, 0.050 mL, 0.39 mmol) to give a white suspension. The liquid was decanted and evaporated. The $^1$H NMR in C$_6$D$_6$, δ: 7.6–7.9 (m, 8H), 6.9–7.1 (m, 12H), 1.8 (d, 4H), 0.2 (s, 12H); $^{31}$P NMR (CrD$_6$) 6–7.9 ppm. Colorless crystals were obtained from slow evaporation of the solvent, and a single crystal x-ray structure, shown in FIG. 1, was determined.

Preparation 5 Bis((diphenylphosphinomethyl)dimethylsilyl)amido)zirconium tris(N,N-dimethyl)amide In a dry-box, a 25 mL vial was charged with (Ph$_2$PCH$_2$SiMe$_2$)$_2$NH (FW 529.7, 340 mg, 0.642 mmol), Zr(NMe$_2$)$_4$ (FW 267.5, 169 mg, 0.632 mmol), and 4 mL toluene. After stirring for 1 hour, the red solution was evaporated to an orange glass.

$^1$H NMR in C6D$_6$, δ: 7.4–7.6 (m, 8H), 7.0–7.2 (m, 12H), 3.0 (s, 18H), 1.55 (d, 4H, J~2 Hz), 0.3 (s, 12H); $^{31}$P NMR (C6D$_6$) δ-19.5 ppm.

ETHYLENE POLYMERIZATION EXAMPLES

Example 1

A 45 mL Parr 316SS Parr reactor was cleaned and dried in a oven at 50° C. The reactor was taken into a dry box and charged with 1.5 μmole bis((diphenylphosphinoethyl)-dimethylsilyl)amido)zirconium trichloride, (preparation 1) 200 microliters of modified methylalumoxane in toluene solution (PMAO-IP, 6.7 percent A1, available from Akzo), and 1.0 mL toluene. After about 1 minute, additional toluene was added (5 mL). The reactor was sealed and removed from the dry box, pressurized with ethylene to 150 psig (1.1 MPa), and placed in a heated block (50° C.) and held for 20 hours (the pressure had dropped to 12 psig (190 kPa). Afterwards, the reactor was vented, and 0.3 mL 6 M HCl was added to destroy the aluminum activator. The reactor contents were poured into a 25 mL vial containing about 8 mL methanol. A small amount of additional methanol was used to rinse the reactor. The suspension was then filtered and the solid was placed in a vacuum oven at 50° C. to give 449 mg polymer. This polymer was partially soluble in hot trichlorobenzene. Analysis of the sample by GPC indicated a molecular weight (Mn) of 5,300 and Mw of 654,000.

Example 2

A 45 mL Parr 316SS Parr reactor was cleaned and dried in a oven at 50° C. The reactor was taken into a dry box and charged with 1.5 μmole of bis((phenylthiomethyl)dimethylsilyl)amido)-zirconium trichloride, (preparation 2) 200 microliters of modified methylalumoxane in toluene solution (PMAO-IP, 6.7 percent A1, available from Akzo), and 1.0 mL toluene. After about 1 minute, additional toluene was added (9 mL). At this point the reactor was sealed and removed from the dry box, pressurized with ethylene to 148 psig (1.1 MPa), and placed in a heated block (50° C.) and held for 4 hours. Afterwards, the reactor was vented, and 0.3 mL 6 M HCl was added to destroy the aluminum activator. The reactor contents were poured into a 25 mL vial containing about 8 mL methanol. A small amount of additional methanol was used to rinse the reactor. The suspension was then filtered and the solid was placed in a vacuum oven at 50° C. to give 343 mg polymer. This polymer was insoluble in Cl$_2$CHCHCl$_2$ (20 mg polymer in 1.5 g solvent) after heating overnight in a flask containing refluxing m-xylene (boiling point 138° C.).

Example 3

A 45 ml Parr reactor was dried for an hour in an oven heated to about 75° C. and was charged in a glove box with 1–2 mg of bis((diphenylphosphinomethyl)dimethylsilyl)amido)-zirconium (N,N-dimethylamido)dichloride (Preparation 3), 250 microliters of modified methylalumoxane in toluene solution (PMAO-IP, 6.7 percent A1, available from Akzo), and 1 mL toluene. After stirring the contents for 1 minute, an additional 9 mL toluene was added. At this point the reactor was sealed and removed from the dry box, pressurized with ethylene to 148 psig (1.1 MPa), and placed in a heated block (50° C.) and held over night. After the workup described in example 1, 440 mg of polymer resulted. This polymer was insoluble (but very swollen) after attempts to dissolve it in trichlorobenzene at 160° C. for 2 hours, then 180° C. for 30 minutes. It was possible to obtain a carbon NMR on the swollen polymer: $^{13}$C NMR (mixture of o-Cl$_2$C$_6$H$_4$, Cl$_2$CDCDCl$_2$, and chromium acetoacetonate as a relaxation agent) δ in ppm (integrated area) 39.0 (2.0), 33.9 (1.6), 34.4 (0.5), 32.2 (4.1), 30.0 (980.7), 26.8 (1.5), 26.1 (0.7), 22.9 (4.3), 14.1 (4.6)

Example 4

A 45 ml Parr reactor was dried for an hour in an oven heated to about 75° C. and was charged in a glove box with 1–2 mg of bis((diphenylphosphinomethyl)dimethylsilyl)amido)zirconium trichloride (Preparation 4), 200 microliters of modified methylalumoxane in toluene solution (PMAO-IP, 6.7 percent Al, available from Akzo), and 5.0 mL of toluene. At this point the reactor was sealed and removed from the dry box, pressurized with ethylene to 148 psig (1.1 MPa) for two minutes and placed in a heated block (50° C.) and held over night. The reactor was removed from the heated block and allowed to cool. The reactor was opened to reveal a white suspension which was treated with 5 mL 1 M HCl, stirred for 5 minutes, and filtered. The white fibrous powder was washed with water (5 mL), and twice with methanol (5 mL), and placed in a 50° C. vacuum oven overnight to give 337 mg of polymer. This sample was insoluble (but swollen) after heating overnight to about 150° C. in a mixture of o-$Cl_2C_6H_4$, and $Cl_2CDCDCl_2$.

In the claims:

1. A process for polymerization of one or more addition polymerizable monomers comprising contacting said monomer or monomers under addition polymerization conditions with a catalyst composition comprising the reaction product or admixture resulting upon combination of:

(A) a metal complex corresponding to the formula:

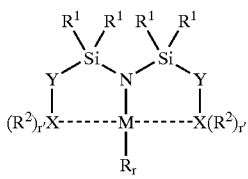

where,

Y is a divalent bridging group;

$R^1$ each occurrence is independently selected from alkyl, aryl, hydrogen, aryloxy, arylthio, alkyloxy, or alkylthio, having up to 10 atoms not counting hydrogen;

$R^2$ independently each occurrence is an aryl group of up to 10 atoms not counting hydrogen;

X is phosphorus, sulfur, nitrogen, or oxygen;

r' is 1 or 2 to satisfy the valence of X;

M is a group 4 metal in the +4 oxidation state or a group 5 metal in the +5 oxidation state;

R is a monovalent ligand group or 2 R groups together are a divalent ligand group; and r is 3 or 4 depending on the valence of M; and (B) an activating cocatalyst, wherein the molar ratio of (A) to (B) is from 1:10,000 to 100:1, and recovering the resulting polymeric product.

2. The process of claim 1, wherein the metal, M, is a metal of Group 4 of the Periodic Table of the Elements, and R, independently each occurrence, is halide, hydrocarbyl, hydrocarbyloxide, hydrocarbylsulfide, N,N-dihydrocarbylamide, hydrocarbyleneamide, or N-hydrocarbylimide, said R having from 1 to 20 atoms not counting hydrogen.

3. The process of claim 1 wherein;

M is zirconium;

X is nitrogen or phosphorus;

Y is $(CH_2)_{n'}$ wherein n' is 1–4;

R is chloride, N,N-dimethylamino or $C_{1-10}$ hydrocarbyl;

$R^1$ is $C_{1-6}$ hydrocarbyl; and $R^2$ is phenyl.

4. The process of claim 1 wherein the metal complex is:

bis((diphenylphosphinomethyl)dimethylsilyl)amido)zirconium trichloride; bis((diphenylphosphinomethyl)dimethylsilyl)amido)zirconium tris(N,N-dimethylamide); bis((diphenylphosphinomethyl)dimethylsilyl)amido)zirconium bis(N,N-dimethylamide) chloride;

bis((diphenylphosphinomethyl)dimethylsilyl)amido)zirconium (N,N-dimethylamide)-dichloride; or bis((phenylthiomethyl)dimethylsilyl)amido)zirconium trichloride.

5. The process of claim 1 wherein one or more $C_{2-20}$ olefins are polymerized.

6. The process of claim 1 wherein the activating cocatalyst is selected from the group consisting of: polymeric and oligomeric alumoxanes; $C_{1-20}$ hydrocarbyl substituted Group 13 element containing, Lewis acid compounds; Bronsted acids containing an inert, non-coordinating anion containing a $C_{1-20}$ hydrocarbyl substituted Group 13 element; mixtures of the foregoing alumoxanes and alumoxane/Lewis acid mixtures with one or more aliphatic or aromatic ethers; and mixtures of the foregoing.

* * * * *